United States Patent
Jung et al.

(10) Patent No.: US 10,334,472 B2
(45) Date of Patent: Jun. 25, 2019

(54) QOS SWITCHING METHOD AND APPARATUS FOR QOS IN A WIRELESS COMMUNICATION SYSTEM

(71) Applicant: Samsung Electronics Co., Ltd., Gyeonggi-do (KR)

(72) Inventors: Dae-Kwon Jung, Gyeonggi-do (KR); Hee-Won Kang, Gyeonggi-do (KR); Eun-Jung Kim, Gyeonggi-do (KR); Myung-Kwang Byun, Gyeonggi-do (KR); Jeong-Ho Lee, Gyeonggi-do (KR); Eun-Ho Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/584,731

(22) Filed: Dec. 29, 2014

(65) Prior Publication Data

US 2015/0189540 A1 Jul. 2, 2015

(30) Foreign Application Priority Data

Dec. 27, 2013 (KR) ................ 10-2013-0165681

(51) Int. Cl.

| H04W 28/02 | (2009.01) |
|---|---|
| H04W 72/08 | (2009.01) |
| H04W 28/24 | (2009.01) |
| H04L 12/819 | (2013.01) |
| H04L 12/833 | (2013.01) |
| H04L 12/917 | (2013.01) |
| H04L 12/927 | (2013.01) |
| H04L 12/841 | (2013.01) |

(52) U.S. Cl.
CPC ..... *H04W 28/0268* (2013.01); *H04L 47/2458* (2013.01); *H04L 47/76* (2013.01); *H04L 47/805* (2013.01); *H04W 28/24* (2013.01); *H04L 47/215* (2013.01); *H04L 47/283* (2013.01); *H04W 72/087* (2013.01)

(58) Field of Classification Search
CPC ..... H04L 47/805; H04L 47/828; H04L 65/80; H04L 69/24; H04L 47/215; H04L 47/2458; H04L 47/76; H04W 28/0268; H04W 72/087; H04W 28/24
See application file for complete search history.

(56) References Cited

U.S. PATENT DOCUMENTS

| 7,130,639 | B2 | 10/2006 | Lee et al. | |
|---|---|---|---|---|
| 7,369,490 | B2 * | 5/2008 | Zahir Azami | H04L 47/11 370/230 |
| 7,653,735 | B2 * | 1/2010 | Mandato | H04L 29/06 709/205 |
| 7,668,176 | B2 | 2/2010 | Chuah | |
| 7,961,617 | B2 | 6/2011 | Hosein | |
| 8,355,413 | B2 | 1/2013 | Vasamsetti et al. | |

* cited by examiner

*Primary Examiner* — Ayaz R Sheikh
*Assistant Examiner* — Debebe A Asefa
(74) *Attorney, Agent, or Firm* — The Farrell Law Firm, P.C.

(57) ABSTRACT

Quality of Service (QoS) switching method and apparatus in a mobile communication system are provided. The method includes determining, based on a total resource usage for providing a plurality of QoSs, the QoS switching relating to level adjustment of the plurality of QoSs corresponding to one of downgrade, upgrade, and grade maintenance, and adjusting levels of the plurality of QoSs according to the determined QoS switching.

28 Claims, 11 Drawing Sheets

QOS SWITCHING METHOD AND APPARATUS FOR QOS IN A WIRELESS COMMUNICATION SYSTEM

PRIORITY

This application claims priority under 35 U.S.C. §119(a) to a Korean Patent Application filed on Dec. 27, 2013 in the Korean Intellectual Property Office and assigned Serial No. 10-2013-0165681, the entire contents of which are incorporated herein by reference.

BACKGROUND

1. Field of the Invention

The present invention relates to a Quality of Service (QoS) in a mobile communication system.

2. Description of the Related Art

When Quality of Service (QoS) requirements of a user requiring the QoS are not satisfied in a communication system, an adverse effect on the QoS of another user may be reduced by changing the service of the user to a low-QoS or a non-QoS and restoring the QoS when the QoS is available later.

The QoS indicates an ability or a measure for guaranteeing a particular performance in data transmission by prioritizing applications, users, or data flows. The performance of the QoS includes a minimum bit rate, delay, jitter, packet loss rate, etc. When a type of the QoS varies, the performance criteria also vary. In a mobile communication system where multiple users share limited air resources, the performance of the QoS requiring the minimum bit rate and being delay sensitive is very important in the system performance.

Conventional methods in terms of flow control and congestion control in a core network do not provide a systematic process and a method for QoS switching adapted to dynamic resource allocation and dynamic availability of resources according to a change of a radio channel quality of the user. In addition, conventional devices in terms of a scheduler of a Media Access Control (MAC) layer applies a condition for triggering the QoS switching to the QoS individually, not as a whole, or conducts the QoS switching per QoS of each user. Thus, the QoS switching is excessive and a dynamic range of the resource usage in the QoS increases.

SUMMARY

The present invention has been made to address the above-discussed deficiencies, and to provide at least the advantages described below. Accordingly, an aspect of the present invention provides a QoS switching method and apparatus for QoS in a mobile communication system which determines QoS switching by periodically comparing a total resource usage of resources used in the QoS to a predefined threshold, and then determining the QoS for the QoS switching by comparing average resource usages per QoS of each user so as to adapt to dynamic availability of resources and to prevent excessive QoS switching.

Another aspect of the present invention is to provide a QoS switching method and apparatus for QoS in a mobile communication system which periodically checks QoS dissatisfaction per QoS and performs QoS switching according to the number of the QoS dissatisfactions.

According to an aspect of the present invention, a QoS switching method of a scheduler in a mobile communication system is provided. The method includes determining, based on a total resource usage for providing a plurality of QoSs, the QoS switching relating to level adjustment of the plurality of QoSs corresponding to one of downgrade, upgrade, and grade maintenance; and adjusting levels of the plurality of QoSs according to the determined QoS switching.

According to another aspect of the present invention, a QoS switching apparatus in a mobile communication system is provided. The apparatus includes a memory configured to store QoS switching information which comprises information of resources allocated to a plurality of QoSs respectively; a QoS switching determiner configured to calculate a total resource usage for providing the plurality of QoSs using the QoS switching information, and determine the QoS switching relating to level adjustment of the plurality of QoSs corresponding to one of downgrade, upgrade, and grade maintenance based on the calculated total resource usage; and a QoS switching controller configured to adjust levels of the plurality of QoSs according to the determined QoS switching.

BRIEF DESCRIPTION OF THE DRAWINGS

The above and other aspects, features, and advantages of the present invention will be more apparent from the following description, taken in conjunction with the accompanying drawings, in which.

DETAILED DESCRIPTION OF EMBODIMENTS OF THE PRESENT INVENTION

Figure 1:
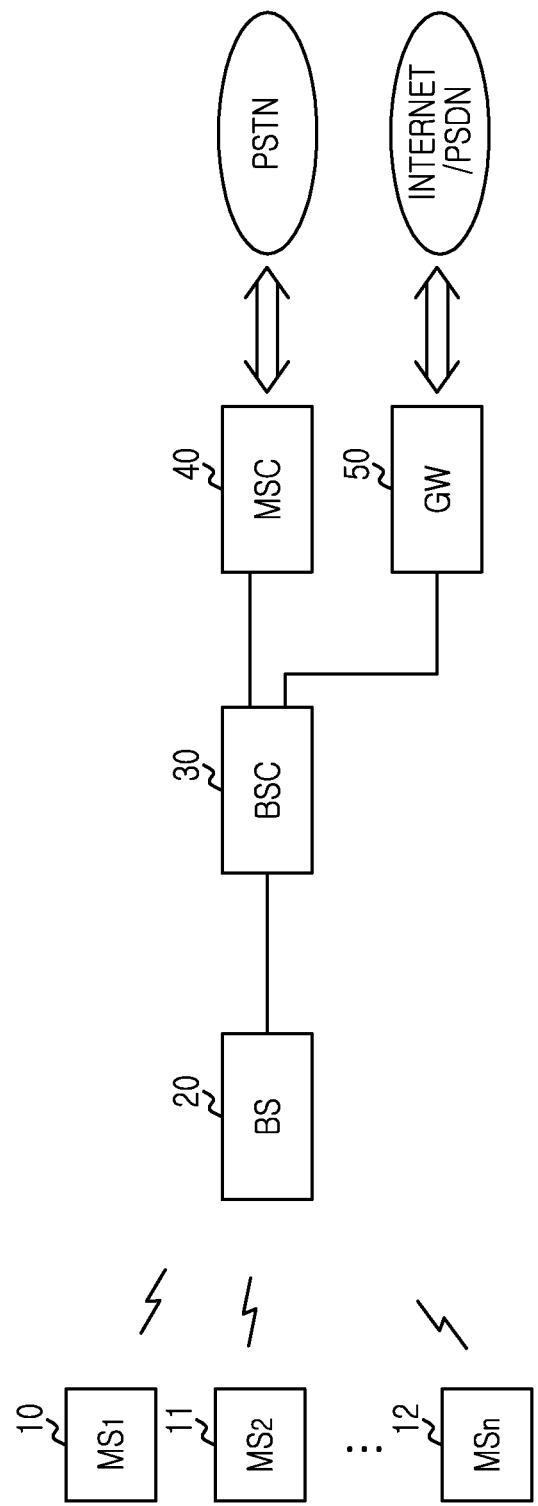
FIG. 1 is a block diagram of a network of a mobile communication system according to an embodiment of the present invention.

The following description with reference to the accompanying drawings is provided to assist in a comprehensive understanding of embodiments of the present invention as defined by the appended claims and their equivalents. Throughout the drawings, like reference numerals will be understood to refer to like parts, components and structures. Various details are provided to assist in that understanding but these are to be regarded as mere examples. Accordingly, those of ordinary skill in the art will recognize that various changes and modifications of the embodiments of the present invention described herein can be made without departing from the scope and spirit of the present invention. In addition, descriptions of well-known functions and constructions may be omitted for clarity and conciseness.

The terms and words used in the following description and claims are not limited to dictionary their meanings, but are merely used to enable a clear and consistent understanding of the present invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to a technique for providing an efficient and satisfactory Quality of Service (QoS) to users using a priority based QoS-aware scheduling algorithm in a mobile communication system supporting the QoS, and more particularly, to a QoS switching method and apparatus for QoS in a mobile communication system which determines QoS switching by periodically comparing a total resource usage of resources used in the QoS to a predefined threshold, and then determining the QoS for the QoS switching by comparing average resource usages per QoS of each user so as to adapt to dynamic availability of resources and to prevent excessive QoS switching.

FIG. 1 is a block diagram of a network of a mobile communication system 1 according to an embodiment of the present invention.

Referring to FIG. 1, the mobile communication system 1 includes Mobile Stations ($MS_1$, $MS_2$, ..., $MS_n$) 10, 11, and 12 being subscribers, a Base Station (BS) 20 wirelessly connected to the $MS_1$ through $MS_n$ 10, 11, and 12 and communicating with the $MS_1$, $MS_2$, ..., $MS_n$ 10, 11, and 12 over a radio channel, and a Base Station Controller (BSC) 30 for connecting to, and communicating with, the BS 20. The BSC 30 is also connected to a Mobile Switching Center (MSC) 40 and a Gateway (GW) 50. The MSC 40 is connected to a circuit network such as a Public Switched Telephone Network (PSTN), and the GW 50 is connected to a packet switched network such as the Internet/Public Switched Data Network (PSDN). When the $MS_1$, $MS_2$, ..., $MS_n$ 10, 11, and 12 are connected to the MSC 40 under control of the BSC 30, a voice service is provided to the $MS_1$, $MS_2$, ..., $MS_n$ 10, 11, and 12. When the $MS_1$, $MS_2$, ..., $MS_n$ 10, 11, and 12 are connected to the GW 50, a packet data service is provided to the $MS_1$, $MS_2$, ..., $MS_n$ 10, 11, and 12. The structure of FIG. 1 generalizes a mobile communication system 1, and names of its components may vary according to a type (e.g., Information System 2000 (IS-2000), Universal Mobile Telecommunications System (UMTS), Long Term Evolution (LTE), Code Division Multiple Access (CDMA) 2000, 7xEnhanced Voice-Data Optimized (EV-DO), General Packet Radio Service (GPRS), 1xEV-DV) of the mobile communication system 1. For example, the GW 60 can be referred to as a Packet Data Service Node (PDSN), an Access Gateway (AG), and a Media Gateway (MG).

Call setup and data delivery between the $MS_1$, $MS_2$, ..., $MS_n$ 10, 11, and 12 and the BS 20 in the mobile communication system 1 of FIG. 1 are performed based on a Quality of Service (QoS) level. To select $MS_1$, $MS_2$, ..., $MS_n$ 10, 11, 12 for using the radio resource based on the priority of the QoS level, the BS 20 compares a total resource usage of resources used in the QoS in every QoS switching period to a threshold, and thus downgrades, upgrades, or maintains the current grade of the QoSs.

The present invention determines whether to downgrade part of the QoSs to a low-QoS or a non-QoS or determines whether to upgrade part of the downgraded low-QoS or non-QoS back to a higher QoS or the original QoS, calculates an average resource usage of the QoS when the QoS downgrade or the QoS upgrade is determined, selects and downgrades part of the QoSs to downgrade to the low-QoS or the non-QoS when the QoS downgrade is determined, and selects and upgrades part of the downgraded low-QoS or non-QoS back to a higher QoS or the original QoS when the QoS upgrade is determined.

$3^{rd}$ Generation Partnership Project (3GPP) LTE defines QoS classes as shown in Table 1 below. A particular QoS Class Identifier (QCI) is allocated to a bearer, and the QIC indicates a set of parameters for processing the packet transport.

TABLE 1

| QCI | Resource Type | Priority | Packet Delay Budget | Packet Error Loss Rate | Example Service |
|---|---|---|---|---|---|
| 1 | Guaranteed Bit Rate (GBR) | 2 | 100 ms | $10^{-2}$ | Conversation Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IP Multimedia Subsystem (IMS) Signaling |
| 6 | | 6 | 300 ms | $10^{-6}$ | Video (Buffered Streaming) Transmission Control Protocol (TCP)-based (e.g. www, e-mail, chat, File Transfer Protocol (ftp), Peer to Peer (p2p) file sharing, progressive video, etc.) |
| 7 | | 7 | 100 ms | $10^{-3}$ | Voice, Video (Live streaming) Interactive Gaming |
| 8 | | 8 | 300 ms | $10^{-6}$ | Video (Buffered Streaming) |

When a resource for providing the QoS is insufficient in the QoS based on the QoS class of Table 1 above, QoS users authorized through QoS call admission control receive the dropped QoS. The dropped QoS implies that at least one of the parameters such as data rate, maximum packet delay budget, and packet error loss rate required by the corresponding QoS is not satisfied. When the drop of the QoS is expected, several users receive the unsatisfactory QoS during the lack of the resource. Hence, it is necessary to take a proper action. Likewise, when the resource for the QoS is sufficient, it is necessary to take a proper action to maximize the QoS.

In such cases, QoS switching is performed. The QoS switching includes QoS downgrade and QoS upgrade. Table 2 below shows methods for triggering the QoS switching.

TABLE 2

| A method for triggering the QoS | Details |
|---|---|
| A first method | Periodically, comparing an average usage of resources used for the QoS service or an average usage rate of a maximum amount of resources to predefined threshold.<br>If it is greater than a predefined downgrade threshold, performing QoS downgrade.<br>If it is less than a predefined upgrade threshold, performing QoS upgrade.<br>If it is less than or equal to the predefined downgrade threshold and it is greater than or equal to a predefined upgrade threshold, maintaining the current grade of the QoS. |
| A second method | Periodically checking whether the individual QoS services are unsatisfactory or not.<br>If the number of an unsatisfactory QoS services is larger than a predefined dissatisfactory threshold, performing QoS downgrade.<br>If the number of an unsatisfactory QoS services is equal to zero, performing QoS upgrade.<br>If the number of an unsatisfactory QoS services is greater than a zero and is less than or equals to a predefined dissatisfactory threshold, maintaining the current grade of the QoS. |

The first method for triggering the QoS is described below.

Table 3 below shows parameters of the QoS downgrade and the QoS upgrade of the first method.

TABLE 3

| Variable | Mark | Meaning |
|---|---|---|
| The maximum amount of resources to be assigned | R_max | A maximum amount of resources which a system can assign. |
| QoS downgrade threshold | R_downgrade | A threshold used as a criterion for performing QoS downgrade. R_downgrade = R_max * (R_downgrade, ratio/100) |
| QoS upgrade threshold | R_upgrade | A threshold used as a criterion for performing QoS upgrade. R_upgrade = R_max * (R_upgrade, ratio/100) |
| A total average resource usage assigned | R_usage | R_usage is defined in two way, as follows:<br>Definition 1: before allocating non-QoS services, the average value of the total resource usage to which adds resources allocated for the control channels and the other base channels and the resources allocated for the QoS services.<br>Definition 2: The average amount of the resources allocated to only the QoS services. |

The QoS downgrade and the QoS upgrade are not conducted together in every QoS switching period (T_switch). R_usage is calculated in every T_switch. When R_usage is greater than R_downgrade, the QoS is downgraded. When R_usage is less than R_upgrade, the QoS is upgraded. R_downgrade must not fall below R_upgrade. When R_usage is less than or equal to R_downgrade and greater than or equal to R_upgrade, the QoS is not switched and the current level of the QoSs is maintained.

In the first method, the QoS switching can be controlled by three parameters as shown in Table 4 below.

TABLE 4

| Parameter | Mark | Meaning | Unit |
|---|---|---|---|
| QoS switching period | T_switch | A period for performing QoS downgrade or QoS upgrade. It can be set by the system operator. | Transmission Time Interval (TTI) |
| QoS downgrade threshold[%] | R_downgrade, ratio | A threshold used as a criterion for performing QoS downgrade. It is indicated as the ratio of the maximum amount of resources to be assigned (R_max). It can be set by the system operator. | % |
| QoS upgrade threshold[%] | R_upgrade, ratio | A threshold used as a criterion for performing QoS upgrade. It is indicated as the ratio of the maximum amount of resources to be assigned | % |

TABLE 4-continued

| Parameter | Mark | Meaning | Unit |
| --- | --- | --- | --- |
| | | (R_max). It is less than QoS downgrade threshold. It can be set by the system operator. | |

The QoS switching period T_switch indicates a period of the QoS downgrade or the QoS upgrade. When the period is too short, the QoS is switched too frequently. Accordingly, it is advantageous that the period is a little long within a range for estimating the change of the radio channel quality of the users.

A scheduler calculates R_usage in every T_switch, identifies a condition for the QoS switching, and performs the QoS switching. The condition for triggering the QoS downgrade and the QoS upgrade is described below. That is, the QoS downgrade is performed when R_usage is greater than R_downgrade, and the QoS upgrade is performed when R_usage is less than R_upgrade.

The second method for triggering the QoS switching is described below. The scheduler determines in every T_switch that the individual QoS is dissatisfactory, and triggers the QoS switching according to the number of the dissatisfactory QoSs. Two criteria are used to determine the QoS dissatisfaction.

First, the QoS dissatisfaction is determined when an average throughput of the individual QoS is less than (GBR*Rate_threshold) and/or an estimated delay of the individual QoS is greater than (packet delay budget*Delay_threshold). Herein, the GBR denotes a Guaranteed Bit Rate and indicates a guaranteed minimum data rate. The QoS dissatisfaction can be determined even when one of the two conditions is satisfied, and the QoS dissatisfaction can be determined when both conditions are satisfied.

Second, the QoS dissatisfaction is determined when the QoS scheduler is a token-bucket based scheduler. The token is a data unit of bits to send in every Transmission Time Interval (TTI) to guarantee the GBR of the QoS, and the token burst is the number of maximum tokens calculated by considering the packet delay budget or the maximum latency of the QoS. The QoS dissatisfaction is determined when an average of the scheduled bits for one TTI of the individual QoS is less than (token size*Token_threshold) and/or an accumulated token size of the individual QoS is greater than (token bucket size*Bucket_threshold). The QoS dissatisfaction can be determined even when one of the two conditions is satisfied, and the QoS dissatisfaction can be determined when both conditions are satisfied.

The parameters Rate_threshold, Delay_threshold, Token_threshold, and Bucket_threshold used to determine the QoS dissatisfaction are adjustable. Table 5 below shows the parameters used to determine the QoS dissatisfaction.

TABLE 5

| Mark | Meaning | Unit |
| --- | --- | --- |
| Rate_threshold | A threshold for adjusting the relative allowable value for GBR. It can be set by the system operator. | % |
| Delay_threshold | A threshold for adjusting the relative allowable value for the maximum allowable delay or latency. It can be set by the system operator. | % |
| Token_threshold | A threshold for indicating the relative percentage of the token size. It adjusts the relative allowable value for GBR. It can be set by the system operator. | % |
| Bucket_threshold | A threshold for indicating the relative percentage of the token bucket size. It adjusts the relative allowable value for the maximum allowable delay or latency. It can be set by the system operator. | % |
| Dissatisfactory_threshold | A threshold used as a criterion for performing QoS downgrade. A threshold of the number of an unsatisfactory QoS service. It can be set by the system operator. | |

The second method triggers the QoS downgrade and the QoS upgrade based on the following condition. Dissatisfactory_threshold denotes a threshold of the dissatisfactory QoSs as shown in Table 5 above. When the number of the dissatisfactory QoSs is greater than Dissatisfactory_threshold, the QoS is downgraded. When the number of the dissatisfactory QoSs is zero, the QoS is upgraded. When the number of the dissatisfactory QoSs is greater than zero and less than or equal to Dissatisfactory_threshold, the QoS is not switched.

The QoS of each user is switched according to the first method and the second method as follows. The scheduler calculates the average resource usage $R_{i,j}$ per QoS of each user during T_switch. Herein, "i" denotes a user index and "j" denotes a QoS index. For the normal QoS, the resources allocated to the service are added to calculate the average resource usage. When the QoS is downgraded currently, the average resource usage is calculated by estimating the resource usage allocable to the original QoS based on the radio channel quality of the corresponding MS during T_switch. The normal QoS means a QoS that has not been downgraded/upgraded and the original QoS means a QoS prior to being downgraded/upgraded.

The first method and the second method downgrade the QoS as follows. When the QoS downgrade is triggered, the QoS of the user who uses the resource most is selected as the QoS to downgrade according to two schemes.

The first scheme, based on the resource used, selects the QoS of the greatest average resource usage $R_{i,j}$ of the normal QoSs as the QoS to downgrade.

The second scheme, based on the priority, selects the QoS of the lowest priority and the greatest average resource usage $R_{i,j}$ of the normal QoSs as the QoS to downgrade.

Table 6 below shows options for selecting the QoS to downgrade or to upgrade.

TABLE 6

| Option | QoS Downgrade | QoS Upgrade |
| --- | --- | --- |
| Resource usage priority | QoS service of which an average resource usage $R_{i,j}$ is greatest of the normal QoS services. | QoS service of which an estimated average resource usage $R_{i,j}$ is lowest of downgraded QoS services. The estimated average resource usage $R_{i,j}$ is a resource usage that can be allocated to an original QoS service. |
| Priority | QoS service of which the priority is lowest and an average resource usage $R_{i,j}$ is greatest of the normal QoS services. | QoS service of which the priority is greatest and an average resource usage $R_{i,j}$ is lowest of the downgraded QoS services. The estimated average resource usage $R_{i,j}$ is a resource usage that can be allocated to an original QoS service. |

The scheduler downgrades one or more QoSs by calculating R_overload=R_usage−R_downgrade, decreasing R_overload by $R_{i,j}$ of the selected QoS, and repeating this process until R_overload ≤0. It is noted that the second method for triggering the QoS switching may not select the dissatisfactory QoS as the QoS to downgrade.

When the QoS to downgrade is determined, the priority of the corresponding QoS is downgraded to the low priority according to options. Table 7 below shows the options for adjusting the priority of the selected QoS.

TABLE 7

| Option | QoS Downgrade | QoS Upgrade |
| --- | --- | --- |
| A sequential control | A priority which is one step lower than the current priority (when the QoS reaches the highest priority of the non-QoS, it is not downgraded any further). | A priority which is one step higher than the current priority (when the priority reaches the original priority, it is not upgraded any further). |
| A instantaneous control | The highest priority of the non-QoS. | The original priority (the priority before the downgrade). |

When the QoS to downgrade is determined, the current priority is downgraded to the next lower priority according to a sequential control method or downgraded to the highest priority of the non-QoS according to an instantaneous control method. When the QoS reaches the highest priority of the non-QoS, it is not downgraded any further.

Meanwhile, when the QoS upgrade is triggered, the method identifies at least one downgraded QoS. When detecting the at least one downgraded QoS, the method selects the QoS of the user who uses the least resources as the QoS to upgrade according to two schemes.

The first scheme, based on the resources used, selects the QoS of the smallest average resource usage $R_{i,j}$ estimated (allocable to the original QoS) among the downgraded QoSs, as the QoS to upgrade. Herein, the average resource usage is estimated based on the average channel quality of T_switch and a QoS guarantee level.

The second scheme, based on the priority, selects the QoS of the highest priority and the smallest average resource usage $R_{i,j}$ estimated (allocable to the original QoS) among the downgraded QoSs, as the QoS to upgrade.

The scheduler upgrades one or more QoSs by calculating R_underload=R_upgrade−R_usage, decreasing R_underload by $R_{i,j}$ of the selected QoS, and repeating this process until R_underload ≤0.

When the QoS to upgrade is determined, the priority of the corresponding QoS is upgraded to the higher priority according to the two options. As shown in Table 7 above, the current priority is upgraded to the next higher priority according to the sequential control method or upgraded to the original priority (the priority before the downgrade) according to the instantaneous control method. When the priority reaches the original priority, it is not upgraded any further.

Figure 2:
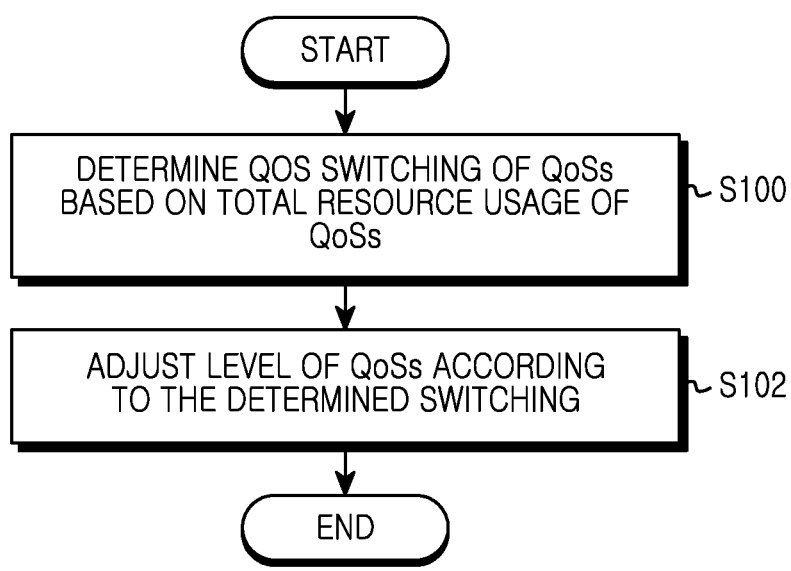
FIG. 2 is a flowchart of a QoS switching method for QoS in a mobile communication system according to an embodiment of the present invention.

FIG. 2 is a flowchart of a QoS switching method of the QoS in the mobile communication system according to an embodiment of the present invention.

Based on the total resource usage for providing a plurality of QoSs, the method determines the QoS switching about the QoS level adjustment corresponding to the downgrade, the upgrade, and the grade maintenance in step S100. Herein, the resource includes power and code of Wideband Code Division Multiple Access (WCDMA), a timeslot of the EV-DO, and a subcarrier of Worldwide Interoperability for Microwave Access (WiMAX) or LTE. Hence, the total resource usage can be obtained by adding the powers, the timeslots, the codes, or the subcarriers used in the QoSs. The total resource usage may be defined as a ratio of percentage with a numeric value.

Figure 3:
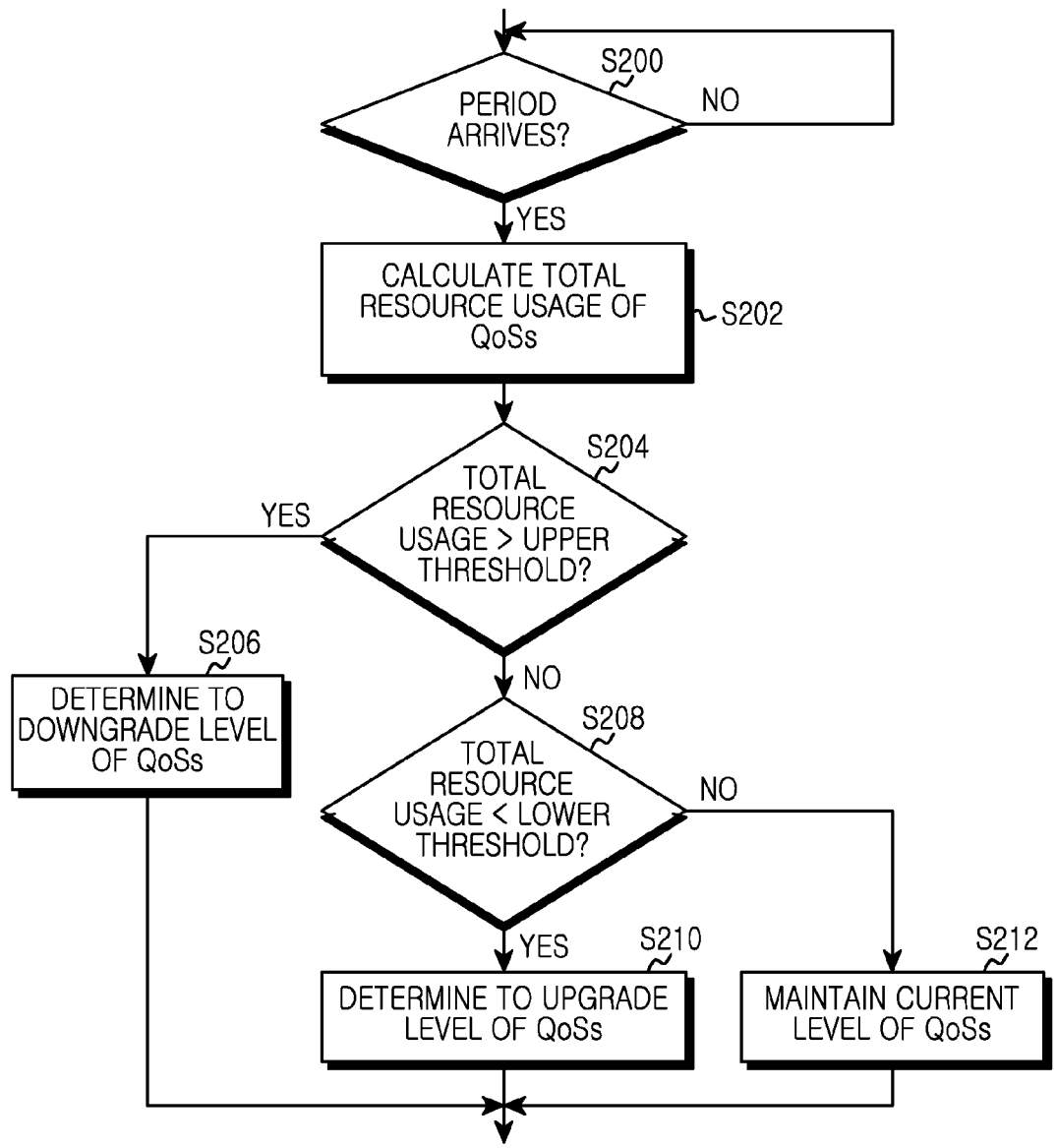
FIG. 3 is a flowchart of a method for determining the QoS switching for QoSs of FIG. 2.

FIG. 3 is a flowchart of a method of determining the QoS switching for the QoSs of step S100 FIG. 2.

Referring to FIG. 3, the method determines whether the period T_switch for the QoS arrives in step S200. The period T_switch corresponds to the QoS switching period.

When the period T_switch arrives in step S200, the method calculates the total resource usage for the QoSs in step S202.

In step S204 and step S208, the method determines whether the calculated total resource usage exceeds a preset threshold range. That is, the method determines whether the total resource usage exceeds an upper threshold of the threshold range in step S204. Herein, the upper threshold of the threshold range corresponds to the QoS downgrade threshold as aforementioned and is the resource usage threshold for the QoS downgrade. The upper threshold may be expressed in percentage.

When the total resource usage exceeds the upper threshold of the threshold range, the method determines to downgrade the level of the QoSs in step S206.

Figure 4:
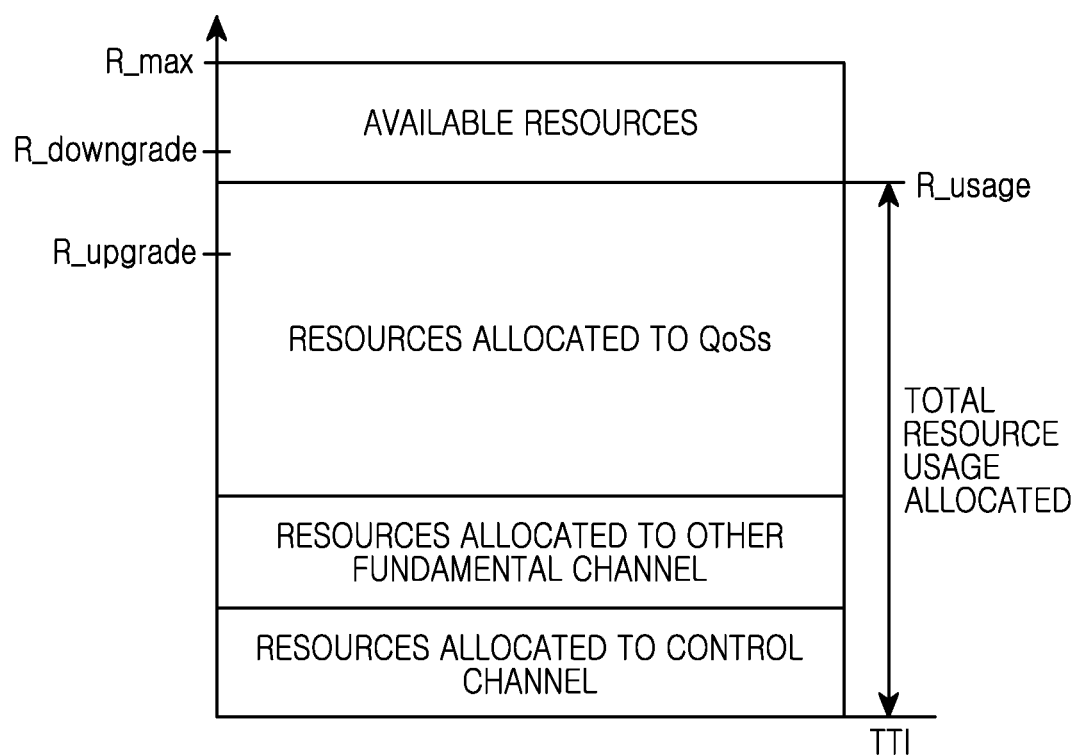
FIGS. 4 and 5 are diagrams of relationships between an upper threshold R_downgrade and a lower threshold R_upgrade of a threshold range and a total resource usage R_usage.
Figure 5:
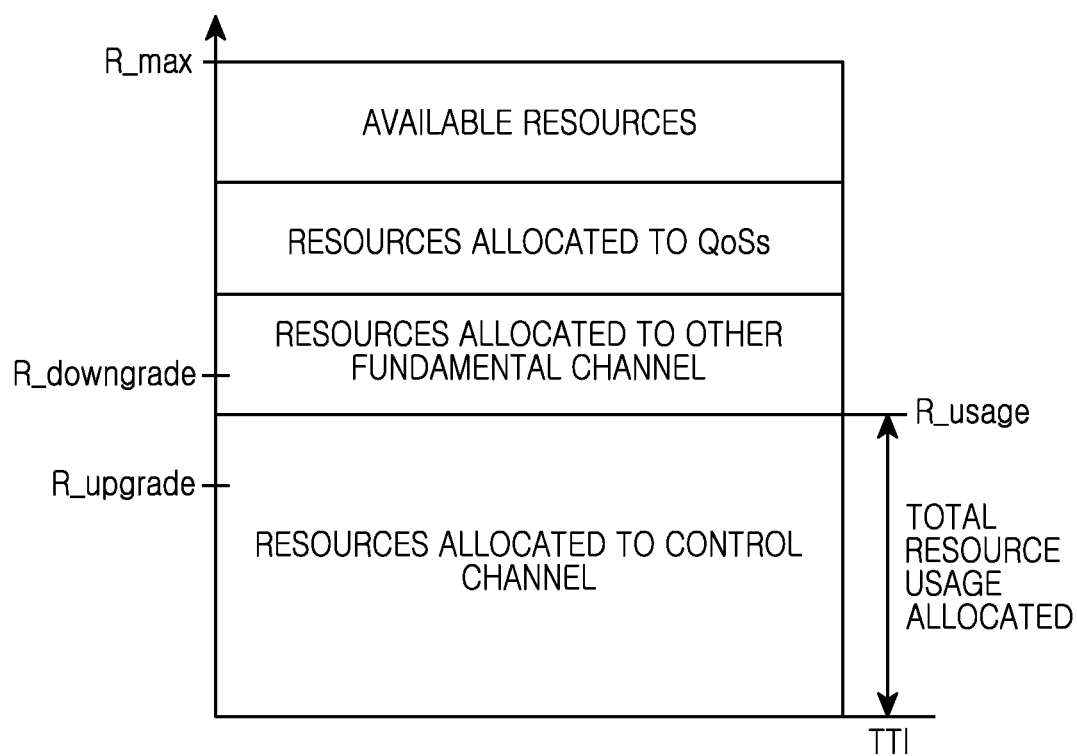

FIGS. 4 and 5 depict relationships between the upper threshold R_downgrade and the lower threshold R_upgrade of the threshold range and the total resource usage R_usage. The total resource usage R_usage of FIG. 4 adds resources allocated to control channels and other fundamental channels before the resource allocation to the non-QoSs and the resources allocated to the QoSs. The total resource usage R_usage of FIG. 5 adds the resources allocated to the QoSs. As shown in FIG. 4 or FIG. 5, when the total resource usage R_usage exceeds the upper threshold R_downgrade of the threshold range, the level of the QoSs is downgraded.

When the total resource usage does not exceed the upper threshold R_downgrade of the threshold range, the method determines whether the calculated total resource usage falls below a lower threshold R_upgrade of the threshold range in step S208. Herein, the lower threshold R_upgrade of the threshold range corresponds to the QoS upgrade threshold as aforementioned and is the resource usage threshold for the QoS upgrade. The lower threshold R_upgrade may be expressed in percentage.

When the calculated total resource usage falls below the lower threshold R_upgrade of the threshold range, the method determines to upgrade the level of the QoSs in step S210. As shown in FIG. 4 or FIG. 5, when the total resource usage R_usage falls below the lower threshold R_upgrade of the threshold range, the method determines to upgrade the level of the QoSs.

When the calculated total resource usage is between the upper threshold R_downgrade and the lower threshold R_upgrade of the threshold range, the method determines to maintain the level of the QoSs in step S212. That is, when the calculated total resource usage is between the upper threshold R_downgrade and the lower threshold R_upgrade, the method determines to maintain the QoS switching, because there is no need to adjust the QoS switching.

Figure 6:
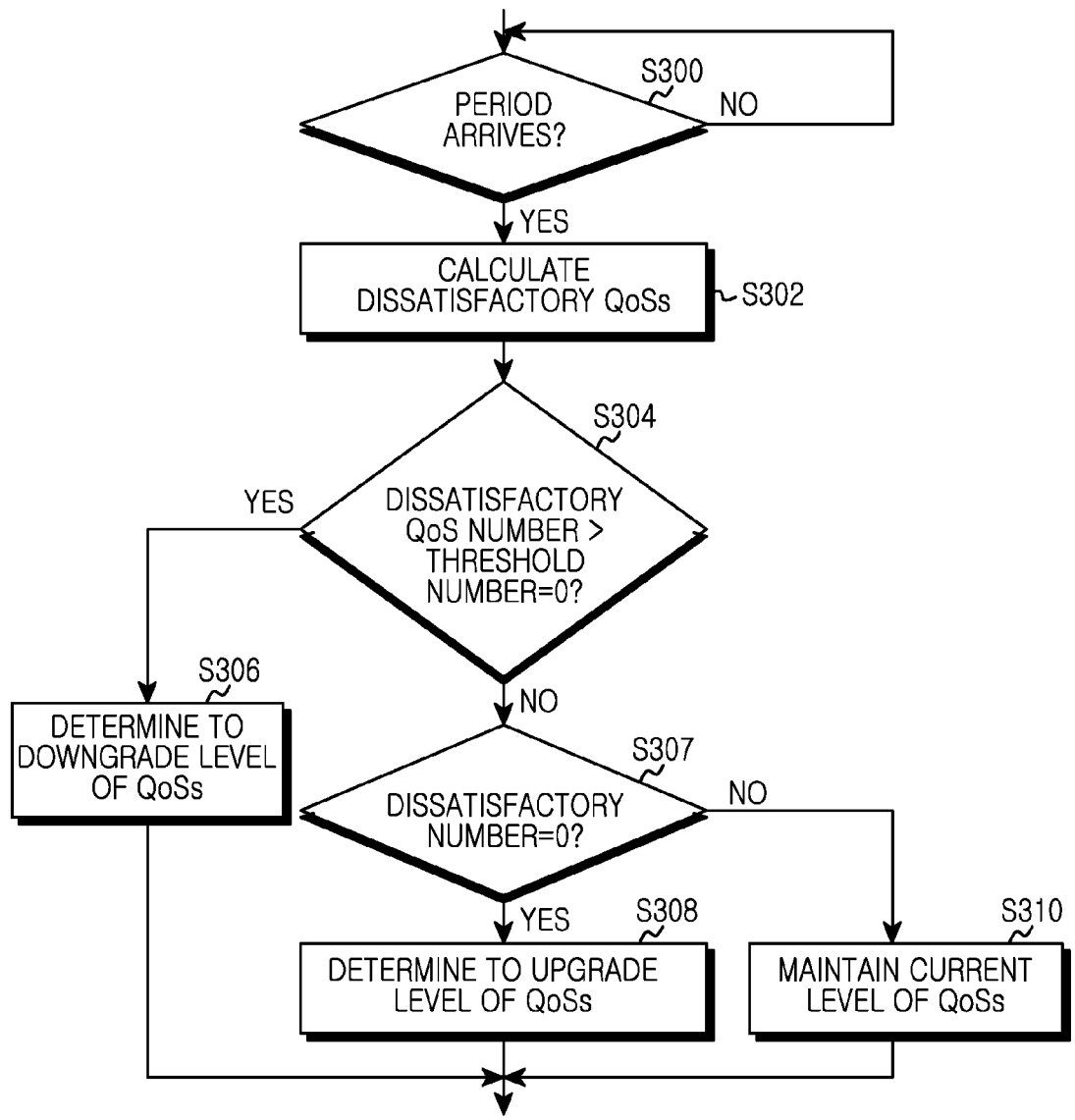
FIG. 6 is a flowchart of a method of determining QoS switching for QoSs of FIG. 2.

FIG. 6 is a flowchart of a method of determining the QoS switching for the QoSs of step S100 of FIG. 2.

Referring to FIG. 6, the method determines whether the period T_switch for the QoS arrives in step S300. The period T_switch corresponds to the QoS switching period.

When the period T_switch arrives in step S300, the method calculates the number of the dissatisfactory QoSs not satisfying the QoS among the QoSs in step S302. Herein, a quality criterion for the QoS can include a reference data rate or a reference delay time for the data delivery. The reference data rate is produced by multiplying a threshold for controlling a relative allowed value of the GBR by the GBR, and the reference delay time is produced by multiplying a threshold for controlling a relative allowed value of the maximum delay by the maximum delay. Herein, the GBR denotes the Guaranteed Bit Rate and indicates the guaranteed minimum data rate.

The scheduler determines the QoSs not satisfying the QoS when the average data rate of the QoSs is less than the reference data rate and/or the transmission delay of the QoSs is greater than the reference delay, and calculates the number of the corresponding QoSs as the number of the dissatisfactory QoSs. For example, when the average throughput of an individual QoS is less than (GBR*Rate_threshold) and/or the estimated delay of the individual QoS is greater than (packet delay budget*Delay_threshold), the scheduler determines that the individual QoS is dissatisfactory.

A quality criterion for the QoS of the token-bucket based scheduler can include a reference number of scheduled bits or a reference accumulated token size. The reference number of scheduled bits is produced by multiplying a threshold indicating the relative ratio to the token size by the token size, and the reference accumulated token size is produced by multiplying a threshold indicating the relative ratio to the token bucket size by the token bucket size.

The scheduler determines a QoS not satisfying the QoS when the average scheduled bits of the QoSs are less than the reference scheduled bits and/or the accumulated token size of the QoSs is greater than the reference accumulated token size, and calculates the number of the corresponding QoSs as the number of the dissatisfactory QoSs. For example, when the average of the scheduled bits for one TTI of an individual QoS is less than (token size* Token_threshold) and/or when the accumulated token size of the individual QoS is greater than (token bucket size* Bucket_threshold), the scheduler determines that the corresponding QoS is dissatisfactory.

In step S304, the method determines whether the calculated dissatisfactory number exceeds a dissatisfactory threshold. The dissatisfactory threshold is a threshold for the number of the dissatisfactory QoSs used to determine whether to downgrade or upgrade the QoS.

When the calculated dissatisfactory number exceeds the dissatisfactory threshold in step S304, the method determines to downgrade the level of all or a portion of the normal QoSs in step S306.

By contrast, when the calculated dissatisfactory number does not exceed the dissatisfactory threshold, the method determines whether the calculated dissatisfactory number is zero in step S307.

When the calculated dissatisfactory number is zero, the method determines to upgrade the level of a portion or all of the downgraded QoSs in step S308.

When the calculated dissatisfactory number is greater than zero and less than or equal to the dissatisfactory threshold, the method maintains the current level of the QoSs without downgrading or upgrading the QoS in step 310.

After step S100 in FIG. 2, the method adjusts the level of the QoSs according to the determined switching in step S102.

Figure 7:
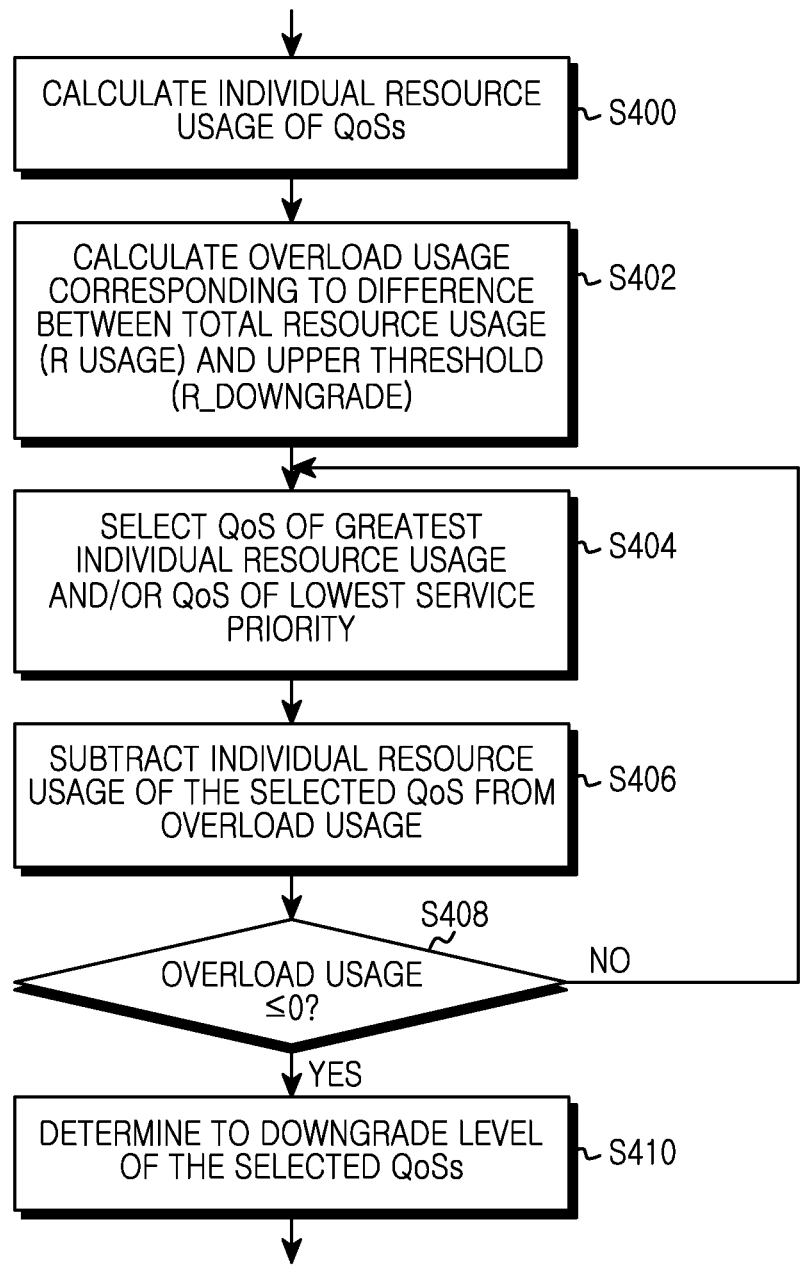
FIG. 7 is a flowchart of a method of adjusting a level of a QoSs determined to downgrade.

FIG. 7 is a flowchart of a method of adjusting the level of the QoSs determined to downgrade in step S102 of FIG. 2.

Referring to FIG. 7, upon determining to downgrade the level of the QoSs, the method calculates an individual resource usage of each QoS in step S400. The method calculates the individual resource usage $R_{i,j}$ per QoS. Herein, "i" denotes the user index and "j" denotes the QoS index. For a normal QoS, the resources allocated to the normal QoS are added to calculate the individual resource usage.

In step S402, the method calculates an overload usage corresponding to a difference between the total resource usage R_usage and the upper thresholdR_downgrade. The overload usage is calculated based on Equation (1) as follows.

$$\text{overload usage} = \text{total resource usage } R\_usage - \text{upper threshold } R\_downgrade \quad (1)$$

In step S404, the method selects the QoS of the greatest individual resource usage calculated and/or the QoS of the lowest QoS priority. There are two methods for selecting the QoS to downgrade. The first method, based on the resource used, selects the QoS of the greatest individual resource usage $R_{i,j}$ among the normal QoSs, as the QoS to downgrade. The second scheme, based on the priority, selects the QoS of the lowest priority and the greatest individual resource usage $R_{i,j}$ among the normal QoSs, as the QoS to downgrade.

In step S406, the method subtracts the individual resource usage of the selected QoS from the overload usage. The remaining overload usage is calculated based on Equation (2) as follows.

$$\text{remaining overload usage} = \text{original overload usage} - \text{individual resource usage} \quad (2)$$

In step S408, the method compares the remaining overload usage to zero. When the remaining overload usage is greater than zero, the method repeats step S404 and step S406. The remaining overload usage greater than zero implies that the QoSs still include the QoS to downgrade.

By contrast, when the remaining overload usage is less than or equal to zero, the method stops repeating the process and downgrades the level of the selected QoSs in step S410. The method for downgrading the level of the selected QoSs includes the sequential control method and the instantaneous control method. The sequential control method downgrades the current priority to the next lower priority, and the instantaneous control method downgrades the priority to the highest priority of the non-QoS. When the priority reaches the highest priority of the non-QoS according to the sequential control method, it is not downgraded any further.

Figure 8:
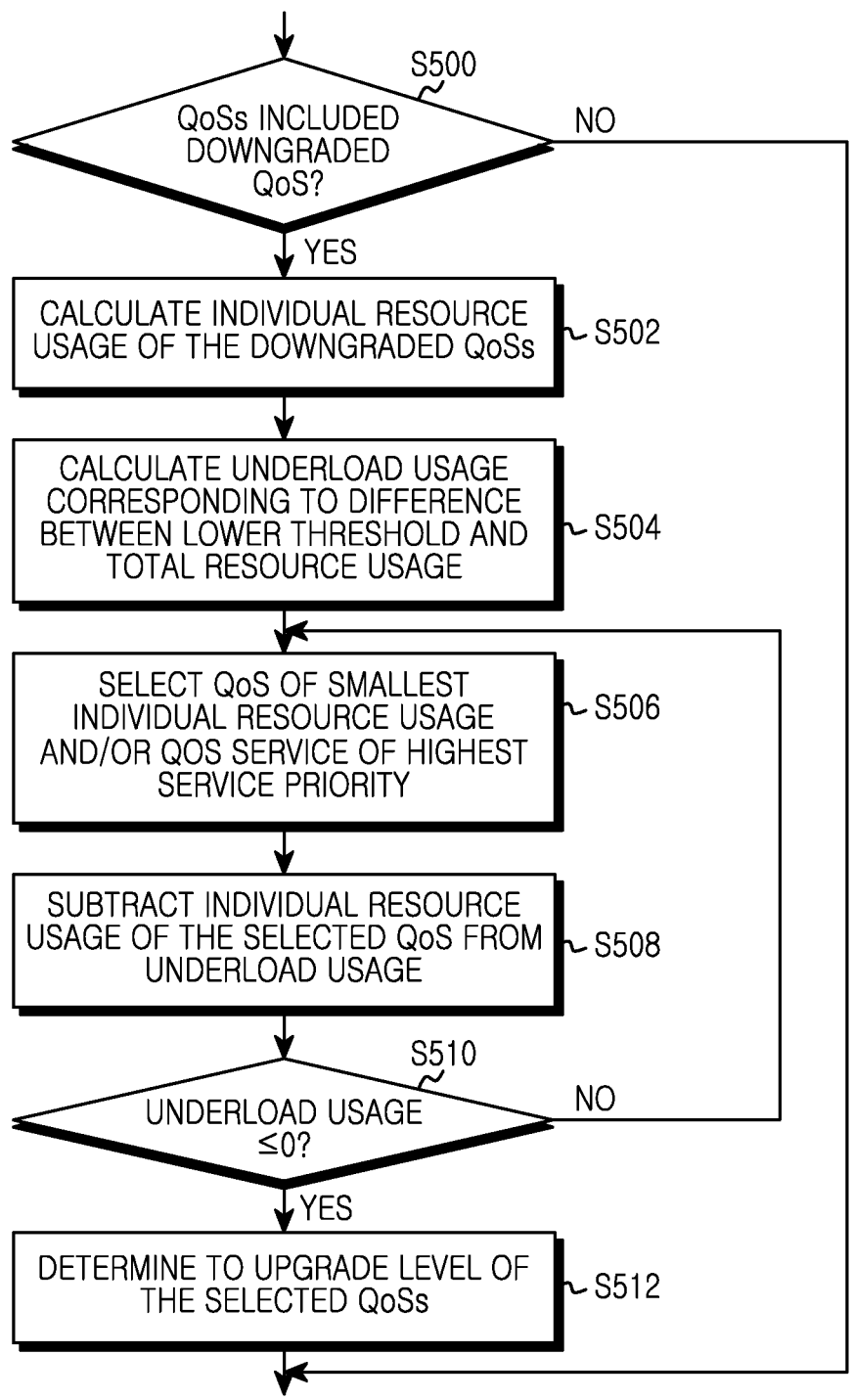
FIG. 8 is a flowchart of a method of adjusting a level of a QoSs determined to upgrade.

FIG. 8 is a flowchart of a method of adjusting the level of the QoSs determined to upgrade in step S102 of FIG. 2.

Referring to FIG. 8, upon determining to upgrade the level of the QoSs, the method determines whether the QoSs still include at least one downgraded QoS in step S500. When there is no downgraded QoS, the method finishes this process because there is no QoS to upgrade.

When confirming at least one downgraded QoS in step S500, the method calculates the individual resource usage of each downgraded QoS in step S502. The individual resource usage of a downgraded QoS is calculated by estimating the resources allocable to the original QoS in consideration of the radio channel quality during the period T_switch.

In step S504, the method calculates an underload usage corresponding to a difference between the lower threshold R_upgrade and the total resource usage. The underload usage is calculated based on Equation (3) as follows.

$$\text{underload usage} = \text{lower threshold } R\_\text{upgrade} - \text{total resource usage} \quad (3)$$

In step S506, the method selects the QoS of the smallest individual resource usage calculated and/or the QoS of the highest QoS priority. There are two methods for selecting the QoS to upgrade. The first method, based on the resource used, selects the QoS of the smallest individual resource usage $R_{i,j}$ estimated among the normal QoSs as the QoS to upgrade. The second scheme, based on the priority, selects the QoS of the highest priority and the greatest individual resource usage $R_{i,j}$ among the normal QoSs as the QoS to upgrade.

In step S508, the method subtracts the individual resource usage of the selected QoS from the underload usage. The remaining underload usage is calculated based on Equation (4) as follows.

$$\text{remaining underload usage} = \text{original underload usage} - \text{individual resource usage} \quad (4)$$

In step S510, the method compares the remaining underload usage to zero. When the remaining underload usage is greater than zero, the method repeats step S506 and step S508. A remaining underload usage greater than zero implies that the QoSs still include a QoS to upgrade.

By contrast, when the remaining underload usage is less than or equal to zero, the method stops repeating the process and upgrades the level of the selected QoSs in step S512. The method for upgrading the level of the selected QoSs includes the sequential control method and the instantaneous control method. The sequential control method upgrades the current priority to the next higher priority, and the instantaneous control method upgrades the priority to the original priority. When the priority reaches the original priority according to the sequential control method, it is not upgraded any further.

Figure 9:
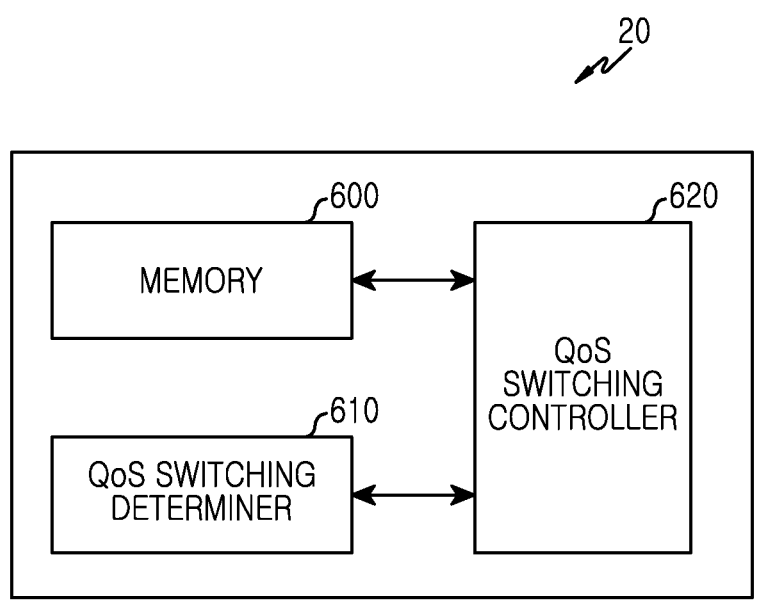
FIG. 9 is a block diagram of a QoS switching apparatus for a QoS in a mobile communication system according to an embodiment of the present invention.

FIG. 9 is a block diagram of a QoS apparatus 20 for the QoS in a mobile communication system according to an embodiment of the present invention, which includes a memory 600, a QoS switching determiner 610, and a QoS switching controller 620.

The memory 600 stores QoS switching information for the QoS 20. The QoS switching information includes information about the resources allocated to the plurality of the QoSs.

The QoS switching determiner 610 calculates the total resource usage for providing the QoSs using the QoS switching information stored in the memory 600, and determines the QoS switching of the QoS level adjustment corresponding to one of the downgrade, the upgrade, or the level maintenance based on the calculated total resource usage.

Figure 10:
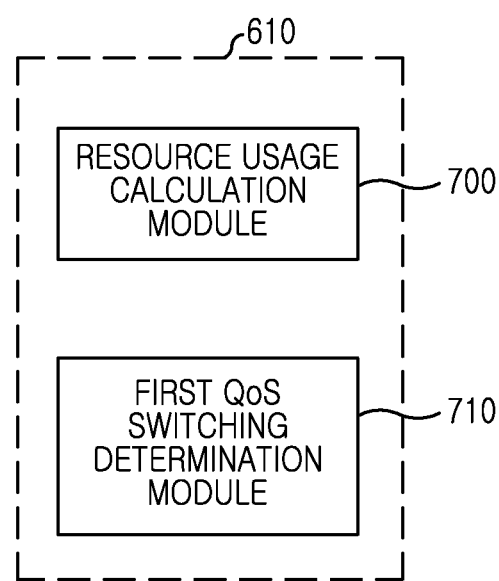
FIG. 10 is a block diagram of a QoS switching determiner of FIG. 9.

FIG. 10 is a block diagram of the QoS switching determiner 610 of FIG. 9, which includes a resource usage calculation module 700 and a first QoS switching determination module 710.

The resource usage calculation module 700 calculates the total resource usage for the QoSs in every period. The resource usage calculation module 700 calculates the total resource usage by adding the powers, the time slots, the codes, or the subcarriers of the QoSs. The total resource usage can be expressed in percentage.

The first QoS switching determination module 710 determines whether the calculated total resource usage exceeds the preset threshold range, determines to downgrade the level of the QoS when the calculated total resource usage exceeds the upper threshold R_downgrade of the threshold range, and determines to upgrade the level of the QoS when the calculated total resource usage falls below the lower threshold R_upgrade of the threshold range. The first QoS switching determination module 710 maintains the current level of the QoSs when the calculated total resource usage is less than or equal to the upper threshold R_downgrade of the threshold range and is greater than or equal to the lower threshold R_upgrade.

The first QoS switching determination module 710 determines whether the total resource usage exceeds the upper threshold R_downgrade of the threshold range. When the calculated total resource usage exceeds the upper threshold R_downgrade of the threshold range, the first QoS switching determination module 710 determines to downgrade the level of the QoS. As shown in FIG. 4 or FIG. 5, when the total resource usage R_usage exceeds the upper threshold R_downgrade of the threshold range, the first QoS switching determination module 710 determines to downgrade the level of the QoSs.

When the total resource usage does not exceed the upper threshold R_downgrade of the threshold range, the first QoS switching determination module 710 determines whether the calculated total resource usage falls below the lower threshold R_upgrade of the threshold range. When the calculated total resource usage falls below the lower threshold R_upgrade of the threshold range, the first QoS switching determination module 710 determines to upgrade the level of the QoSs. As shown in FIG. 4 or FIG. 5, when the total resource usage R_usage is less than the lower threshold R_upgrade of the threshold range, the first QoS switching determination module 710 determines to upgrade the level of the QoSs. By contrast, when the calculated total resource usage is between the upper threshold R_downgrade and the lower threshold R_upgrade, the first QoS switching determination module 710 determines to maintain the level of the QoSs.

Figure 11:
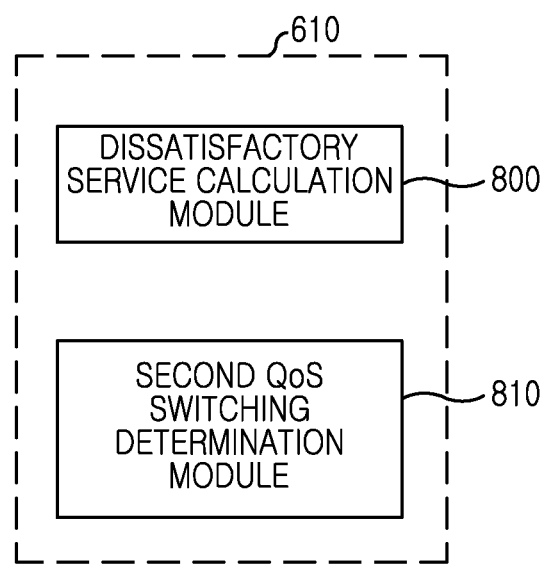
FIG. 11 is a block diagram of the QoS switching determiner of FIG. 9.

FIG. 11 is a block diagram of the QoS switching determiner 610 of FIG. 9, which includes a dissatisfactory service calculation module 800 and a second QoS switching determination module 810.

The dissatisfactory service calculation module 800 calculates the number of the dissatisfactory QoSs not satisfying the QoS among the QoSs in every period.

The dissatisfactory service calculation module 800 determines the QoS not satisfying the QoS when the average data rate of the QoSs is less than the reference data rate and/or the transmission delay of the QoSs is greater than the reference delay, and calculates the number of the corresponding QoSs as the number of the dissatisfactory QoSs. For example, when the average throughput of the individual QoS is less than (GBR*Rate_threshold) and/or the estimated delay of the individual QoS is greater than (packet delay budget*Delay_threshold), the dissatisfactory service calculation module 800 determines that the corresponding QoS is dissatisfactory.

The dissatisfactory service calculation module 800 determines the QoS not satisfying the QoS when the average scheduled bits of the QoSs are less than the reference scheduled bits and/or the accumulated token size of the QoSs is greater than the reference accumulated token size, and calculates the number of the corresponding QoSs as the number of the dissatisfactory QoSs. For example, when the average of the scheduled bits for one TTI of the individual QoS is less than (token size*Token_threshold) and/or the accumulated token size of the individual QoS is greater than (token bucket size*Bucket_threshold), the dissatisfactory service calculation module 800 determines that the corresponding QoS is dissatisfactory.

The second QoS switching determination module 810 determines whether the calculated dissatisfactory number exceeds the threshold R_downgrade. When the calculated dissatisfactory number exceeds the threshold R_downgrade, the second QoS switching determination module 810 determines to downgrade the level of a portion or all of the normal QoSs. When the calculated dissatisfactory number is zero, the second QoS switching determination module 810 determines to upgrade the level of a portion or all of the downgraded QoSs. When the calculated dissatisfactory number is greater than zero and less than or equal to the threshold R_downgrade, the second QoS switching determination module 810 maintains the current level of the QoSs without downgrading or upgrading the QoS.

The QoS switching controller 620 adjusts the level of the QoSs according to the QoS switching determined by the QoS switching determiner 610.

To downgrade the level of the QoSs, the QoS switching controller 620 functions as follows.

The QoS switching controller 620 calculates the individual resource usage of each QoS. For the normal QoS, the QoS switching controller 620 calculates the individual resource usage by adding the resources allocated to the normal QoS. Next, the QoS switching controller 620 calculates the overload usage corresponding to the difference between the total resource usage R_upgrade and the upper threshold R_usage. The QoS switching controller 620 calculates the overload usage based on Equation 1 described above. Next, the QoS switching controller 620 selects the QoS of the greatest individual resource usage calculated and/or the QoS of the lowest QoS priority. The QoS switching controller 620 uses the two methods described above for selecting the QoS to downgrade. Based on the first method, the QoS switching controller 620 selects the QoS of the highest individual resource usage $R_{i,j}$ among the normal QoSs as the QoS to downgrade. Based on the second scheme, the QoS switching controller 620 selects the QoS of the lowest priority and the highest individual resource usage $R_{i,j}$ among the normal QoSs as the QoS to downgrade. Next, the QoS switching controller 620 subtracts the individual resource usage of the selected QoS from the overload usage. The QoS switching controller 620 calculates the remaining overload usage based on Equation 2 described above. Next, the QoS switching controller 620 compares the remaining overload usage to zero. When the remaining overload usage is greater than zero, the QoS switching controller 620 repeats selecting the QoS and calculating the remaining overload usage. When the remaining overload usage is less than or equal to zero, the QoS switching controller 620 stops repeating the process and downgrades the level of the selected QoSs. The QoS switching controller 620 uses the sequential control method or the instantaneous control method to downgrade the level of the selected QoSs. According to the sequential control method, the QoS switching controller 620 downgrades the current priority to the next lower priority. According to the instantaneous control method, the QoS switching controller 620 downgrades the priority to the highest priority of the non-QoS. When the priority reaches the highest priority of the non-QoS according to the sequential control method, the QoS switching controller 620 does not downgrade the priority any further.

To upgrade the level of the QoSs, the QoS switching controller 620 functions as follows.

The QoS switching controller 620 determines whether the QoSs include at least one downgraded QoS. When there is no downgraded QoS, the QoS switching controller 620 ends the process because there is no QoS to upgrade. By contrast, after confirming that there is at least one downgraded QoS, the QoS switching controller 620 calculates the individual resource usage of the downgraded QoS. The QoS switching controller 620 can calculate the individual resource usage of the downgraded QoS by estimating the resources allocable to the original QoS in consideration of the radio channel quality during the period T_switch. Next, the QoS switching controller 620 calculates the underload usage corresponding to the difference between the lower threshold and the total resource usage. The QoS switching controller 620 calculates the underload usage based on Equation 3 described above. Next, the QoS switching controller 620 selects the QoS of the smallest individual resource usage calculated and/or the QoS of the highest QoS priority. The QoS switching controller 620 uses the two methods for selecting the QoS to upgrade. Based on the first method, the QoS switching controller 620 selects the QoS of the smallest individual resource usage $R_{i,j}$ estimated among the normal QoSs, as the QoS to upgrade. Based on the second scheme, the QoS switching controller 620 selects the QoS of the highest priority and the greatest individual resource usage $R_{i,j}$ among the normal QoSs, as the QoS to upgrade. Next, the QoS switching controller 620 subtracts the individual resource usage of the selected QoS from the underload usage. The QoS switching controller 620 calculates the remaining underload usage based on Equation 4 described above. Next, the QoS switching controller 620 compares the remaining underload usage to zero. When the remaining underload usage is greater than zero, the QoS switching controller 620 repeats selecting the QoS and calculating the remaining underload usage. When the remaining underload usage is less than or equal to zero, the QoS switching controller 620 stops repeating the process and upgrades the level of the selected QoSs. The QoS switching controller 620 uses the sequential control method or the instantaneous control method to upgrade the level of the selected QoSs. Based on the sequential control method, the QoS switching controller 620 upgrades the current priority to the next higher priority. Based on the instantaneous control method, the QoS switching controller 620 upgrades the priority to the original priority. When the priority reaches the original priority according to the sequential control method, the QoS switching controller 620 does not upgrade the priority any further.

The methods as described in the claims and/or the specification of embodiments of the present invention can be implemented using hardware, software, or a combination thereof. As for software, a non-transitory computer-readable storage medium including one or more programs (e.g. software modules) can be provided. One or more programs stored in the non-transitory computer-readable storage medium can be configured for execution by one or more processors of an electronic device. One or more programs include instructions for controlling the electronic device to execute the methods according to the embodiments of the present invention as described in the claims and/or the specification of the present invention.

Such a program (e.g., software module, software) can be stored in a Random Access Memory (RAM), a non-volatile memory including a flash memory, a Read Only Memory (ROM), an Electrically Erasable Programmable ROM (EE-PROM), a magnetic disc storage device, a Compact Disc (CD)-ROM, Digital Versatile Discs (DVDs) or other optical storage devices, and a magnetic cassette. Alternatively, the programs can be stored in a memory combining a portion or all of those recording media. A plurality of memories can be equipped.

The programs can be stored in an attachable storage device accessible via a communication network such as the Internet, an Intranet, a Local Area Network (LAN), a Wide LAN (WLAN), a Storage Area Network (SAN), or a communication network by combining these networks. The storage device can access the present electronic device via an external port. A separate storage device may access the present electronic device via a communication network.

As set forth above, when the resource for the QoS is insufficient or the QoS is dissatisfactory, the better QoS can be provided by adapting to the dynamic resource allocation and the dynamic availability of resources according to the change of the radio channel quality of the user.

Thus, the resource utilization is maximized in the mobile communication system of the limited resources, and the efficient and satisfactory QoS can be provided to the greatest number of the MSs.

While the present invention has been shown and described with reference to certain embodiments thereof, it will be understood by those skilled in the art that various changes in form and details may be made therein without departing from the scope and spirit of the present invention as defined by the appended claims and their equivalents.

What is claimed is:

1. A method for operating a base station (BS) in a wireless communication system, the method comprising:
   determining, by at least one processor of the BS, whether to downgrade or to upgrade at least one quality of service (QoS) level of at least one QoS service based on a total amount of resource usage for the plurality of QoS services;
   calculating resource usage of each QoS service for the plurality of QoS services;
   downgrading, by the at least one processor, at least one QoS level of a first subset of QoS services, if the total amount of resource usage is greater than a first threshold;
   upgrading, by the at least one processor, at least one QoS level of a second subset of QoS services, if the total amount of resource usage is less than a second threshold; and
   transmitting, by the at least one processor, data based on the downgraded QoS level or the upgraded QoS level,
   wherein the first subset of QoS services is selected until a difference between the total amount of resource usage and the first threshold is less than an amount of resource usage for the selected first subset, by sequentially selecting a QoS service with high resource usage, and
   wherein the second subset of QoS services is selected until a difference between the total amount of resource usage and the second threshold is less than an amount of resource usage for the selected second subset, by sequentially selecting a QoS service with low resource usage among QoS services with a high priority.

2. The method of claim 1, wherein the total amount of resource usage comprises one or more of a total power value for providing the plurality of QoS services, a total time slot value for providing the plurality of QoS services, a total code value for providing the plurality of QoS services, and a total subcarrier value for providing the plurality of QoS services.

3. The method of claim 1, wherein the first subset of QoS services comprises a QoS service of which an average resource usage is greatest among QoS services having a lowest priority.

4. The method of claim 1, wherein downgrading the at least one QoS level comprises downgrading, by the at least one processor, a QoS level of a QoS service to a next lower QoS level.

5. The method of claim 1, wherein downgrading the at least one QoS level comprises downgrading, by the at least on processor, a QoS level of a QoS service to a highest level of a non-QoS service.

6. The method of claim 1, wherein the second subset of QoS services comprises a QoS service of which an average resource usage is smallest among QoS services having a highest priority.

7. The method of claim 1, wherein upgrading the at least one QoS level comprises upgrading, by the at least one processor, a QoS level of a QoS service to a next higher QoS level.

8. The method of claim 1, wherein upgrading the at least one QoS level comprises upgrading, by the at least one processor, a QoS level of a QoS service to a QoS level before downgrading.

9. A method for operating a base station (BS) in a wireless communication system, the method comprising:
   determining, by at least one processor of the BS, whether to downgrade or to upgrade at least one quality of service (QoS) level of at least one QoS service based on a number of at least one unsatisfactory QoS service among a plurality of QoS services;
calculating resource usage of each QoS service for the plurality of QoS services;
downgrading, by the at least one processor, at least one QoS level of a first subset of QoS services, if the number of the at least one unsatisfactory QoS service is greater than a first threshold;
upgrading, by the at least one processor, at least one QoS level of a second subset of QoS services, if the number of the at least one unsatisfactory QoS service is less than a second threshold; and
transmitting, by the at least one processor, data based on the downgraded QoS level or the upgraded QoS level,
wherein the first subset of QoS services is selected until a difference between the total amount of resource usage and the first threshold is less than an amount of resource usage for the selected first subset, by sequentially selecting a QoS service with high resource usage,
wherein the second subset of QoS services is selected until a difference between the total amount of resource usage and the second threshold is less than an amount of resource usage for the selected second subset, by sequentially selecting a QoS service with low resource usage among QoS services with a high priority, and
wherein the at least one unsatisfactory QoS service comprises at least one QoS service where at least one value related to QoS parameters belongs to a predefined range.

10. The method of claim 9, wherein the number of the at least one unsatisfactory QoS service is determined by:
determining, by the at least one processor, among the plurality of QoS services, at least one unsatisfactory QoS service having a delay that is greater than a delay threshold; and
determining by the at least one processor, a number of the determined at least one unsatisfactory QoS service.

11. The method of claim 9, wherein the number of the at least one unsatisfactory QoS service is determined by:
determining, by the at least one processor, the at least one unsatisfactory QoS service having an average throughput that is less than a third threshold that is determined based on a guaranteed bit rate (GBR), among the plurality of QoS services; and
determining, by the at least one processor, a number of the determined at least one unsatisfactory QoS service.

12. The method of claim 9, wherein the number of the at least one unsatisfactory QoS service is determined by:
determining, by the at least one processor, the at least one unsatisfactory QoS service having an average of scheduled bits for one transmission time interval (TTI) that is less than a third threshold that is determined based on a number of bits for a guaranteed bit rate (GBR), among the plurality of QoS services; and
determining, by the at least one processor, a number of the determined at least one unsatisfactory QoS service.

13. The method of claim 9, wherein the number of the at least one unsatisfactory QoS service is determined by:
determining, by the at least one processor, the at least one unsatisfactory QoS service having an accumulated data unit size that is greater than a third threshold that is determined based on a maximum allowable delay, among the plurality of QoS services; and
determining, by the at least one processor, a number of the determined at least one unsatisfactory QoS service.

14. The method of claim 9, wherein upgrading the at least one QoS level of the second subset of QoS services comprises upgrading the at least one QoS level of a second subset of QoS services, if the number of the at least one unsatisfactory QoS service is equal to zero.

15. An apparatus for a base station (BS) in a wireless communication system, the apparatus comprising:
at least one memory configured to store instructions; and
at least one processor, operatively coupled to the at least one memory, configured to execute the stored instructions to:
determine whether to downgrade or to upgrade at least one quality of service (QoS) level of at least one QoS service based on a total amount of resource usage for a plurality of QoS services;
calculate resource usage of each QoS service for the plurality of QoS services;
downgrade at least one QoS level of a first subset of QoS services, if the total amount of resource usage is greater than a first threshold;
upgrade at least one QoS level of a second subset of QoS services, if the total amount of resource usage is less than a second threshold; and
transmit data based on the downgraded QoS level or the upgraded QoS level,
wherein the first subset of QoS services is selected until a difference between the total amount of resource usage and the first threshold is less than an amount of resource usage for the selected first subset, by sequentially selecting a QoS service with high resource usage, and
wherein the second subset of QoS services is selected until a difference between the total amount of resource usage and the second threshold is less than an amount of resource usage for the selected second subset, by sequentially selecting a QoS service with low resource usage among QoS services with a high priority.

16. The apparatus of claim 15, wherein the total amount of resource usage comprises one or more of a total power value for providing the plurality of QoS services, a total time slot value for providing the plurality of QoS services, a total code value for providing the plurality of QoS services, and a total subcarrier value for providing the plurality of QoS services.

17. The apparatus of claim 15, wherein the first subset of QoS services comprises a QoS service of which an average resource usage is greatest among QoS services having a lowest priority.

18. The apparatus of claim 15, wherein the at least one processor is further configured to downgrade a QoS level of a QoS service to a next lower QoS level.

19. The apparatus of claim 15, wherein the at least one processor is further configured to downgrade a QoS level of a QoS service to a highest level of a non-QoS service.

20. The apparatus of claim 15, wherein the second subset of QoS services comprises a QoS service of which an average resource usage is smallest among QoS services having a highest priority.

21. The apparatus of claim 15, wherein the at least one processor is further configured to upgrade a QoS level of a QoS service to a next higher QoS level.

22. The apparatus of claim 15, wherein the at least one processor is further configured to upgrade a QoS level a QoS service to a QoS level before downgrading.

23. An apparatus for a base station (BS) in a wireless communication system, the method comprising:
at least one memory configured to store instructions; and
at least one processor, operatively coupled to the at least one memory, configured to execute the stored instructions to:

determine whether to downgrade or to upgrade at least one quality of service (QoS) level of at least one QoS services based on a number of at least one unsatisfactory QoS among a plurality of QoS services.

calculate resource usage of each QoS service for the plurality of QoS services;

downgrade at least one QoS level of a first subset of QoS services, if the number of at least one unsatisfactory QoS service is greater than a first threshold;

upgrade at least one QoS level of a second subset of QoS services, if the number of the at least one unsatisfactory QoS service is less than a second threshold; and transmit data based on the downgraded QoS level or the upgraded QoS level, wherein the first subset of QoS services is selected until a difference between the total amount of resource usage and the first threshold is less than an amount of resource usage for the selected first subset, by sequentially selecting a QoS service with high resource usage, wherein the second subset of QoS services is selected until a difference between the total amount of resource usage and the second threshold is less than amount of resource usage for the selected second subset, by sequentially selecting a QoS service with low resource usage among QoS services with a high priority, and wherein the at least one unsatisfactory QoS service comprises at least one QoS service where at least one value related to QoS parameters belongs to a predefined range.

24. The apparatus of claim 23, wherein the at least one processor is further configured to:

determine, among the plurality of QoS services, at least one unsatisfactory QoS service having a delay that is greater than a delay threshold; and determine the number of the at least one unsatisfactory QoS service.

25. The apparatus of claim 23, wherein the at least one processor is further configured to:

determine at least one unsatisfactory QoS service having an average throughput that is less than a third threshold that is determined based on a guaranteed bit rate (GBR), among the plurality of QoS services; and determine the number of the at least one unsatisfactory QoS service.

26. The apparatus of claim 23, wherein the at least one processor is further configured to:

determine at least one unsatisfactory QoS service having an average of scheduled bits for one transmission time interval (TTI) that is less than a third threshold that is determined based on a number of bits for a guaranteed bit rate (GBR), among the plurality of QoS services; and determine the number of the at least one unsatisfactory QoS service.

27. The apparatus of claim 23, wherein the at least one processor is further configured to:

determine at least one unsatisfactory QoS service having an accumulated data unit size that is greater than a third threshold that is determined based on a maximum allowable delay, among the plurality of QoS services; and determine the number of the at least one unsatisfactory QoS service.

28. The apparatus of claim 23, wherein the at least one processor is further configured to upgrade at least one QoS level of the second subset of QoS services, if the number of at least one unsatisfactory QoS services is equal to zero.

* * * * *